US008257023B2

(12) United States Patent
Belmonte et al.

(10) Patent No.: US 8,257,023 B2
(45) Date of Patent: Sep. 4, 2012

(54) FAN BLADE

(75) Inventors: Olivier Belmonte, Savigny le Temple (FR); Amadou Lamine M'Bengue, Vert Saint Denis (FR)

(73) Assignee: SNECMA, Paris (FR)

( * ) Notice: Subject to any disclaimer, the term of this patent is extended or adjusted under 35 U.S.C. 154(b) by 1433 days.

(21) Appl. No.: 12/055,615

(22) Filed: Mar. 26, 2008

(65) Prior Publication Data

US 2009/0028717 A1 Jan. 29, 2009

(30) Foreign Application Priority Data

Apr. 13, 2007 (FR) ...................................... 07 02682

(51) Int. Cl.
*F01D 5/04* (2006.01)
(52) U.S. Cl. .............................. 415/83; 415/86; 416/175
(58) Field of Classification Search .................. 416/175, 416/193 R, 203; 415/77, 78, 79, 83, 84, 415/86, 87
See application file for complete search history.

(56) References Cited

U.S. PATENT DOCUMENTS

| | | | |
|---|---|---|---|
| 7,631,484 B2 * | 12/2009 | Giffin et al. ................... | 60/226.1 |
| 7,758,303 B1 * | 7/2010 | Wadia et al. ..................... | 415/77 |
| 2006/0024162 A1 * | 2/2006 | Giffin .......................... | 415/208.3 |

FOREIGN PATENT DOCUMENTS

| | | |
|---|---|---|
| EP | 1 201 878 A2 | 5/2002 |
| EP | 1 624 169 A1 | 2/2006 |
| GB | 460781 | 2/1937 |

* cited by examiner

*Primary Examiner* — Edward Look
*Assistant Examiner* — Ryan Ellis
(74) *Attorney, Agent, or Firm* — Oblon, Spivak, McClelland, Maier & Neustadt, L.L.P.

(57) ABSTRACT

The present invention relates to the field of blades, particularly fan blades, intended for turbojets, particularly of the aeronautical type. Its objective is to provide a fan blade the features of which will enable the number of fan blades to be reduced while at the same time providing satisfactory performance. According to the invention, the fan blade comprises a plurality of aerodynamic parts which are superposed in a radial direction Z and the number of aerodynamic profiles varies from one aerodynamic part to the other.

17 Claims, 3 Drawing Sheets

FAN BLADE

BACKGROUND OF THE INVENTION AND DESCRIPTION OF THE PRIOR ART

The present invention relates to the field of blades, particularly fan blades, intended for turbojets, particularly of the aeronautical type.

The turbojet conventionally comprises a compressor, a combustion chamber and a turbine. The purpose of the compressor is to increase the pressure of the air supplied to the combustion chamber. The purpose of the turbine is to drive the rotation of the compressor by tapping off some of the pressure energy of the hot gases leaving the combustion chamber and converting it into mechanical energy.

A turbojet may be of the "bypass" type, that is to say one through which two air flows pass, a primary flow and a secondary flow. The primary flow is produced by elements that make up a single flow turbojet to which one or more additional turbines are added in order to drive a compression stage, the fan. This fan is equipped with large-sized blades, the fan blades, which produce the secondary flow. The fan slightly increases the pressure of the gases passing through it but, because its diameter is large, the energy produced for thrust is high.

One well-known example of a turbojet with a fan, also known as a turbofan is the CFM56 fitted to numerous airplanes across the world for a number of decades now. The successive series of the CFM56 have seen a gradual decrease in the number of fan blades.

Decreasing the number of fan blades on a turbojet is advantageous insofar as it allows a significant reduction in the mass of the turbojet and a reduction in procurement and maintenance costs. This reduction in the number of blades must not, however, be made at the expense of turbojet performance. Preferably, an increase in the chord length of the blades should be avoided in order to limit the size, and thus the mass, of the turbojet.

Gradually reducing the number of blades involves increasing the relative pitch better known in English as the "pitch to chord ratio" and, for the same chord length, increasing the inter-blade distance, that is to say the distance separating two consecutive blades.

The pitch to chord radio is defined as the ratio s/C where:
  s represents the inter-blade pitch ($s=2\pi R/N$) N being number of blades on a bladed disk, and
  C represents the chord of the profile at the radius R considered over the height of a blade, the chord C representing the length of the segment connecting the leading edge to the trailing edge of a blade.

SUMMARY OF THE INVENTION

The objective of the present invention is to provide a fan blade the features of which will enable the number of fan blades to be reduced while at the same time providing satisfactory performance.

To this end, the present invention relates to a bypass turbojet fan blade which comprises a plurality of aerodynamic parts which are superposed in a radial direction Z and in which the number of aerodynamic profiles varies from one aerodynamic part to the other.

One aerodynamic part has aerodynamic properties imparted by at least one aerodynamic profile, each aerodynamic profile comprising a suction face, a pressure face, a leading edge and a trailing edge.

The radial direction z corresponds to the essentially longitudinal direction of a blade. It is usually termed the radial direction by the person skilled in the art because this direction corresponds to a radius leading from the axis of rotation X of the turbojet on which said blade is customarily positioned during operation.

As a preference, the fan blade according to the invention comprises a lower aerodynamic part and an upper aerodynamic part which is superposed in a radial direction Z, each aerodynamic part having at least one aerodynamic profile, the number of aerodynamic profiles of the upper aerodynamic part being greater than the number of aerodynamic profiles of the lower aerodynamic part.

Within the meaning of the present invention, the upper aerodynamic part denotes that part of the blade furthest from the axis of rotation X of the turbojet on which said blade is customarily positioned in operation and the lower aerodynamic part denotes that part of the blade closest to the axis of rotation X of the turbojet.

As a preference, the lower aerodynamic part has a single aerodynamic profile and the upper aerodynamic part has at least two aerodynamic profiles.

As a preference, the aerodynamic profiles of the one and the same aerodynamic part are identical.

The fan blade according to the invention may further comprise a platform separating the lower aerodynamic part and the upper aerodynamic part. This platform may constitute an air splitter, particularly to separate the primary flow from the secondary flow in a bypass turbojet.

The invention also relates to a turbojet comprising at least one fan blade fixed, either by its lower end to a hub, or by its upper ends to a rotary casing.

BRIEF DESCRIPTION OF THE DRAWINGS

Other advantages and features of the invention will become apparent from reading the detailed description which follows, with reference to the attached figures, provided by way of nonlimiting examples, in which.

DESCRIPTION OF THE PREFERRED EMBODIMENTS

Figure 1:
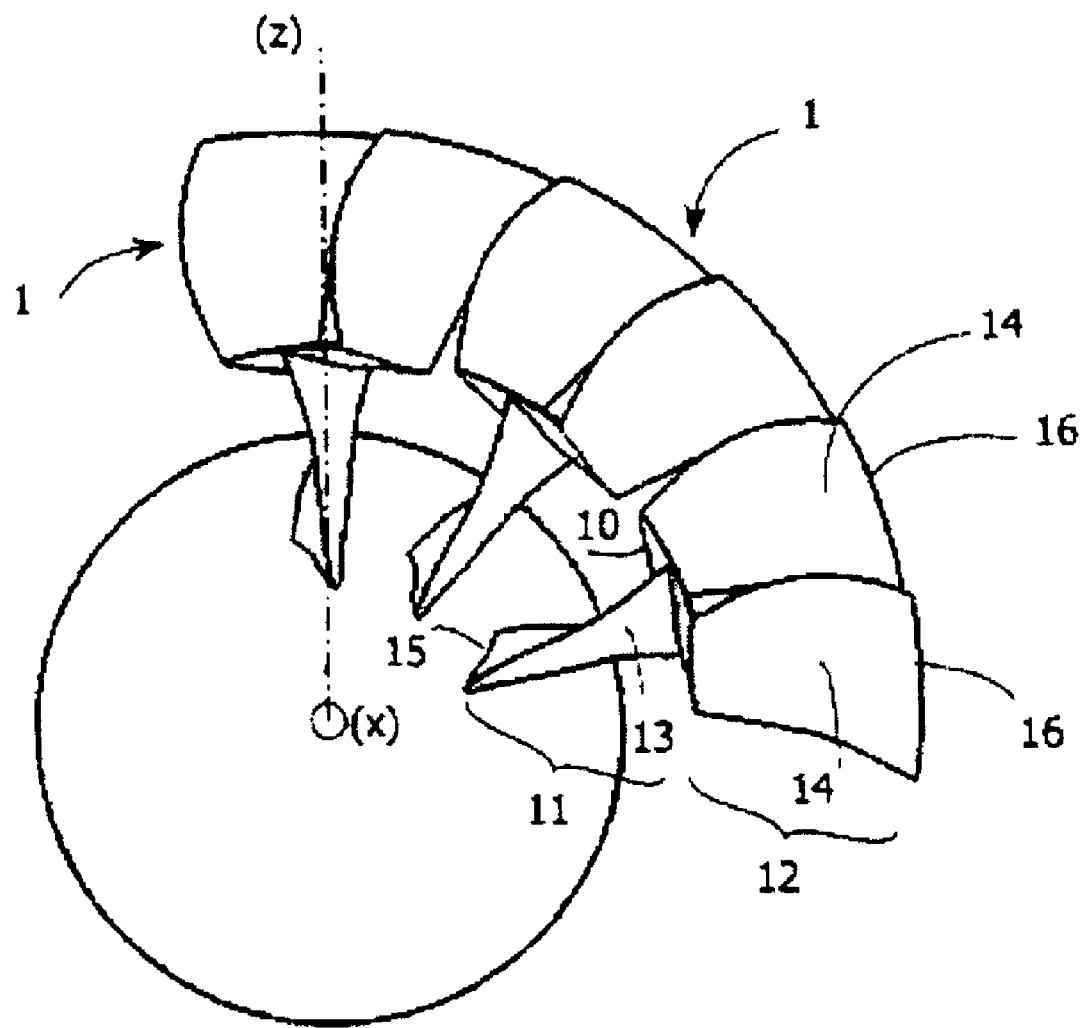
FIG. 1 depicts a front view of fan blades according to the invention positioned on a hub.
Figure 2:
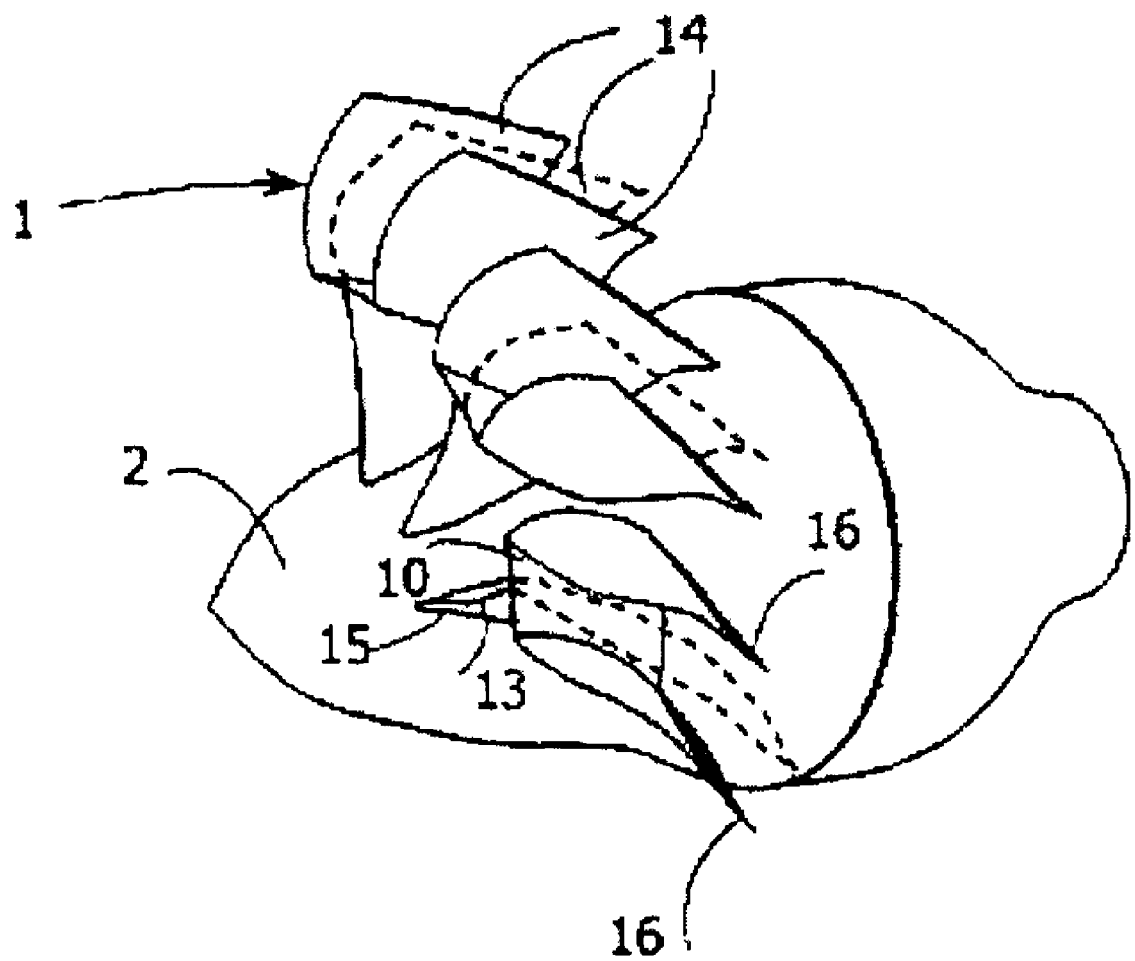
FIG. 2 depicts a perspective view of fan blades according to the invention, positioned on a hub.

FIGS. 1 and 2 depict three fan blades 1 according to the invention positioned on a hub 2 of axis of revolution X. The axis of revolution X of the hub 2 coincides with the axis of rotation X of the turbojet.

The fan blade 1 according to the invention, which extends radially from the axis X, comprises a lower aerodynamic part 11 and an upper aerodynamic part 12. The lower aerodynamic part 11 consists of one aerodynamic profile.

In the example illustrated in FIGS. 1 and 2, the upper aerodynamic part 12 of the fan blade 1 comprises two aerodynamic profiles 14. Alternative forms of embodiment of the invention with a fan blade 1 comprising more than two aerodynamic profiles 14 are also conceivable. A fan blade 1 comprising three aerodynamic profiles 14 is also advantageous. A blade such as this is depicted in dotted line in FIG. 2. These aerodynamic profiles 14 are preferably identical and directed radially.

When the upper aerodynamic part 12 of the fan blade 1 comprises at least two aerodynamic profiles, the number of blades increases and this appreciably reduces the pitch to chord ratio in the upper aerodynamic part 12 of the blade. The pitch to chord ratio at the upper end 16 of the fan blade 1 therefore has more limited values for which the compression ratio is satisfactory.

By keeping a higher pitch to chord ratio on the lower aerodynamic part 11 of the fan blade, it is possible to safeguard against possible aerodynamic lock problems that arise when it becomes difficult to provide the primary flow with a sufficiently high flow rate.

A platform 10 separates the lower aerodynamic part 11 from the upper aerodynamic part 12 of the fan blade 1. This platform 10 connects the upper end of the aerodynamic profile 13 to the lower ends of the other two aerodynamic profiles 14. In order to cause the least possible disturbance to the flow of the primary and secondary flows, this platform 10 needs to lie at a point on the fan blade 1 where the primary and secondary flows form. As a preference, it itself constitutes an air splitter dividing the primary flow from the secondary flow.

As a preference, the platform 10 has an aerodynamic shape so as to guide the flow of air to which it is liable to be subjected.

The platform 10 may also be of the contiguous type, that is to say that it has a shape capable of espousing the complementary and identical shape of an adjacent platform 10 when the fan blades 1 from which they hang are duly positioned on a hub 2.

Figure 3:
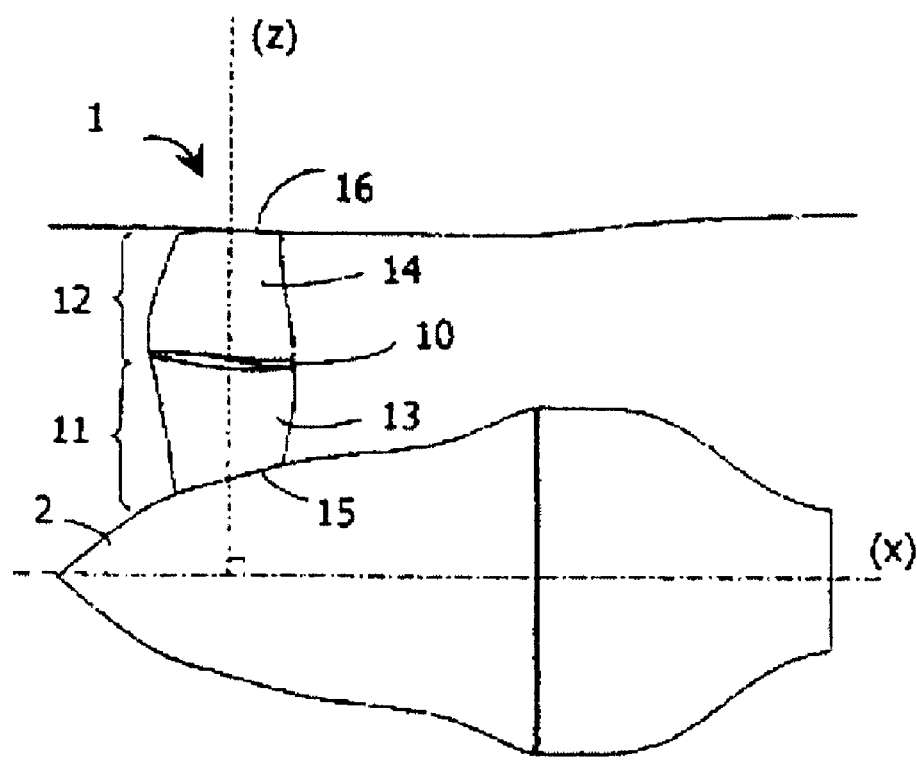
FIG. 3 depicts a side view of a fan blade according to a first embodiment of the invention.

According to a first embodiment depicted in FIG. 3, the fan blade 1 is fixed by its lower end 15 to the hub 2, its upper ends 16 being free. Attachment may be performed using techniques known to those skilled in the art such as, for example, collaboration between a tenon situated at the lower end 15 and sliding in a mortise slot in the hub 2.

Advantageously, the axial size of the aerodynamic profiles 13 and 14 may be substantially identical, for example where they meet one another. Thus, for example, at the platform 10, the axial size of an aerodynamic profile 13 is identical to the axial size of an aerodynamic profile 14. As a result, at the platform 10, the leading edges of the aerodynamic profiles 13 and 14 are axially aligned. Likewise, at the platform 10, the trailing edges of the aerodynamic profiles 13 and 14 are also axially aligned.

In this first embodiment, the fan blade 1 is conventionally subjected to tensile stresses in a radial direction Z with respect to the axis X of the hub 2.

Figure 4:
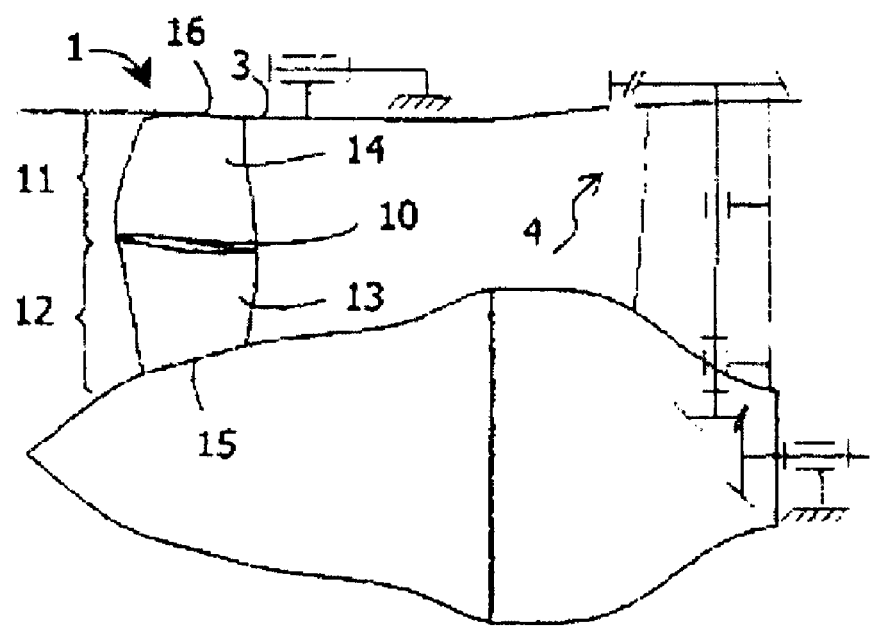
FIG. 4 depicts a side view of a fan blade according to a second embodiment of the invention.

According to a second embodiment depicted in FIG. 4, the fan blade 1 is fixed by each of its upper ends 16 to a rotary casing 3 of axis X, its lower end 15 possibly being free. The rotary casing 3 is in the form of a shell ring surrounding the fan and secured to the latter. The assembly formed by the rotary casing 3 and the fan blades 1 can be rotated about the axis X. Rotational drive of the assembly is performed through a system of gears 4 mechanically connecting the rotary casing 3 to the turbine of the turbojet.

This second embodiment also has the objective of eliminating the clearance between the blades and the casing 3 surrounding them.

In this second embodiment, the fan blade 1 is subjected to compressive stresses. This configuration is advantageous because a mechanical component is better able to withstand compressive stresses than tensile stresses.

Furthermore, the special shape of the fan blade 1 according to the invention contributes to its good mechanical integrity. As the fan rotates, centrifugal forces push the aerodynamic profile 13 and the platform 10 radially outward toward the rotary casing 3. The stresses exerted by these components 10 and 13 are advantageously spread over the two aerodynamic profiles 14 of the upper aerodynamic part 12 of the fan blade 1. The risk of the fan blade 1 buckling, that is to say of lateral deformation due to a normal compressive load, is therefore low.

Attaching a fan blade 1 via the upper aerodynamic part 16 also presents advantages in terms of turbojet efficiency because the clearance between the upper end 16 of a fan blade 1 and the rotary casing 3 becomes nonexistent. Thus, the loss of efficiency due to this clearance in more conventional designs of turbojet disappears.

Furthermore, this type of attachment advantageously makes it possible to reduce the mass of the turbojet by reducing the hub Ri/Re ratio, that is to say the ratio between the internal radius Ri and the external radius Re, Ri being distance to the point on the leading edge of the blade 1 closest to the axis (X) of the turbojet, and Re being the distance to the point on the leading edge of the blade 1 that is furthest from said axis (X). Because the hub 2 is no longer used, in this second embodiment, to attach the blades, the internal radius can be small or even zero. In one extreme case, the turbojet may have no hub 2 for the fan blades 1. For the same external radius Re, the mass of the hub 2 can thus be small or even zero. The mass of the turbojet is thus reduced.

The invention claimed is:

1. A bypass turbojet fan blade, comprising:
   a lower aerodynamic part; and
   an upper aerodynamic part, wherein
   the lower aerodynamic part has a single aerodynamic profile and the upper aerodynamic part has at least two aerodynamic profiles,
   an upper end of the lower aerodynamic part is connected to a first side of a platform,
   a lower end of the upper aerodynamic part is connected to a second side of the platform,
   the first side of the platform is opposite the second side of the platform,
   the second side of the platform is disposed at a radial distance from an axis of rotation that is larger than that of the first side of the platform,
   the single aerodynamic profile is the only aerodynamic profile connected to the first side of the platform, and
   leading edges of all aerodynamic profiles of the upper aerodynamic part are aligned in an axial direction.

2. The fan blade as claimed in claim 1, wherein each of the at least two aerodynamic profiles are identical.

3. The fan blade as claimed in claim 1, wherein the platform and a circumferentially adjacent platform have complementary and identical shapes.

4. The fan blade as claimed in claim 1, wherein the platform constitutes an air splitter, such that an upstream edge of the platform has an aerodynamic profile that divides the inlet flow into a primary flow and a secondary flow.

5. The fan blade as claimed in claim 1, wherein a leading edge of the platform is aligned with a leading edge of the upper end of the lower aerodynamic part in the axial direction.

6. The fan blade as claimed in claim 5, wherein the leading edge of the platform is aligned with a leading edge of the lower end of the upper aerodynamic part in the axial direction.

7. The fan blade as claimed in claim 1, wherein a leading edge of the platform is aligned with a leading edge of the lower end of the upper aerodynamic part in the axial direction.

8. A bypass turbojet fan, comprising:
a plurality of fan blades, wherein
each of the plurality of fan blades includes:
- a lower aerodynamic part; and
- an upper aerodynamic part, the lower aerodynamic part has a single aerodynamic profile and the upper aerodynamic part has at least two aerodynamic profiles, an upper end of the lower aerodynamic part is connected to a first side of a platform, a lower end of the upper aerodynamic part is connected to a second side of the platform, the first side of the platform is opposite the second side of the platform, the second side of the platform is disposed at a radial distance from an axis of rotation that is larger than that of the first side of the platform, the single aerodynamic profile is the only aerodynamic profile connected to the first side of the platform, and leading edges of all aerodynamic profiles of the upper aerodynamic part are aligned in an axial direction.

9. The fan as claimed in claim 8, wherein a leading edge of the platform is aligned with a leading edge of the upper end of the lower aerodynamic part in the axial direction.

10. The fan as claimed in claim 8, wherein a leading edge of the platform is aligned with a leading edge of the lower end of the upper aerodynamic part in the axial direction.

11. The fan as claimed in claim 8, wherein the platform constitutes an air splitter, such that an upstream edge of the platform has an aerodynamic profile that divides the inlet flow into a primary flow and a secondary flow.

12. A bypass turbojet, comprising:
a plurality of fan blades, wherein
each of the plurality of fan blades includes:
- a lower aerodynamic part; and
- an upper aerodynamic part, the lower aerodynamic part has a single aerodynamic profile and the upper aerodynamic part has at least two aerodynamic profiles, an upper end of the lower aerodynamic part is connected to a first side of a platform, a lower end of the upper aerodynamic part is connected to a second side of the platform, the first side of the platform is opposite the second side of the platform, the second side of the platform is disposed at a radial distance from an axis of rotation that is larger than that of the first side of the platform, the single aerodynamic profile is the only aerodynamic profile connected to the first side of the platform, and leading edges of all aerodynamic profiles of the upper aerodynamic part are aligned in an axial direction.

13. The turbojet as claimed in claim 12, wherein each of the plurality of fan blades is fixed to a hub by a lower end of each lower aerodynamic part.

14. The turbojet as claimed in claim 12, wherein each of the plurality of fan blades is fixed to a rotary casing of the turbojet by an upper end of each upper aerodynamic part.

15. The turbojet as claimed in claim 14, wherein the rotary casing is connected by a system of gears to a turbine of the turbojet.

16. The turbojet as claimed in claim 12, wherein a leading edge of the platform is aligned with a leading edge of the upper end of the lower aerodynamic part in the axial direction.

17. The turbojet as claimed in claim 12, wherein
the platform has an axial span extending from an upstream end of the platform to a downstream end of the platform in the axial direction, and
all of the platform disposed upstream of a midpoint of the axial span is free from contact with a casing of the turbojet.

* * * * *